July 17, 1934.  E. H. HAUX  1,966,817

PROCESS OF GROOVING LAMINATED GLASS

Filed April 8, 1933

INVENTOR
E.H. Haux

Patented July 17, 1934

1,966,817

UNITED STATES PATENT OFFICE 1,966,817

PROCESS OF GROOVING LAMINATED GLASS

Elmer H. Haux, Tarentum, Pa., assignor to Duplate Corporation, a corporation of Delaware Application April 8, 1933, Serial No. 665,120

5 Claims. (Cl. 204—1)

The invention relates to a process of grooving laminated glass which ordinarily consists of two sheets of glass secured to the opposite faces of a sheet of reinforcing material, such as cellulose plastic, the materials most commonly used being cellulose nitrate and cellulose acetate. In order to protect this reinforcing interlayer, it is the practice to remove it from the edge of the plate to a distance of about ⅛ inch, and seal the resultant groove with a water-proof protective compound. Concentrated sulphuric acid has been found to be satisfactory for grooving out the interlayer. However, since the reaction is primarily one of dehydration, a deposit of insoluble carbon is formed, and attaches itself to the periphery of the plate. This retards to some extent the uniform action of the acid. The object of the present invention is the provision of an improvement whereby the carbon is removed, and faster and more uniform grooving is secured.

Briefly stated, the desired result is accomplished by supporting the laminated plates to be grooved in a metal rack in the acid bath, and passing a current of electricity through the bath with the rack connected to the positive terminal of the source of current. The formation of the carbon deposit, heretofore referred to, on the periphery of the plate, causes this portion of the glass to become an electrical conductor, and since the plate is carried by the metal rack, the entire periphery of the plate becomes a part of the positive pole of the circuit. The passage of the current through the bath decomposes some of the water, liberating oxygen at the positive pole, which oxygen unites with the carbon forming $CO_2$. This gas escapes from the bath, thus leaving the plate free from carbon.

Figure 1:
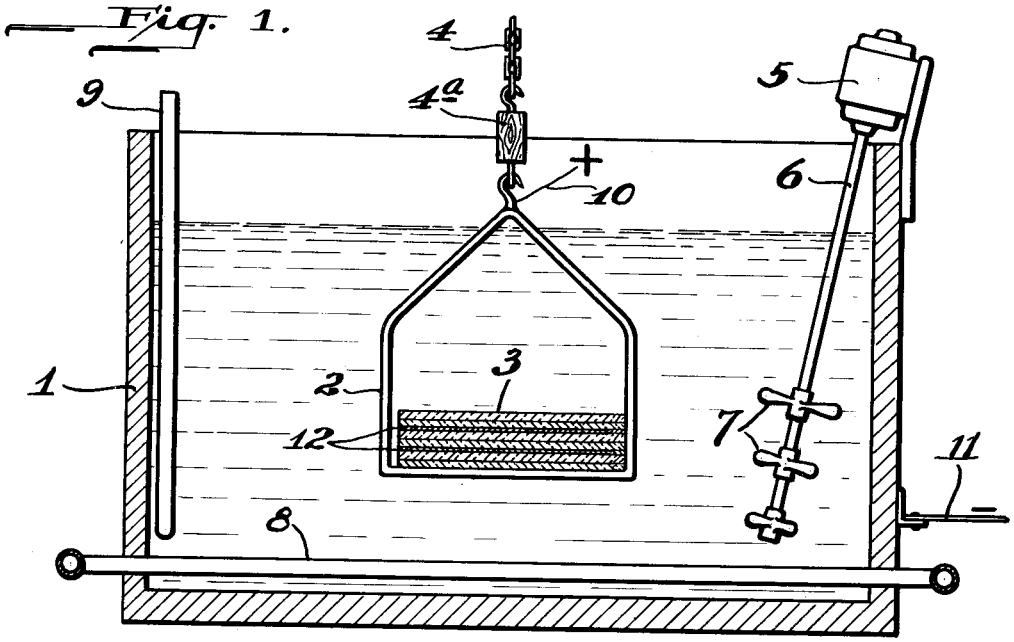
Figure 2:
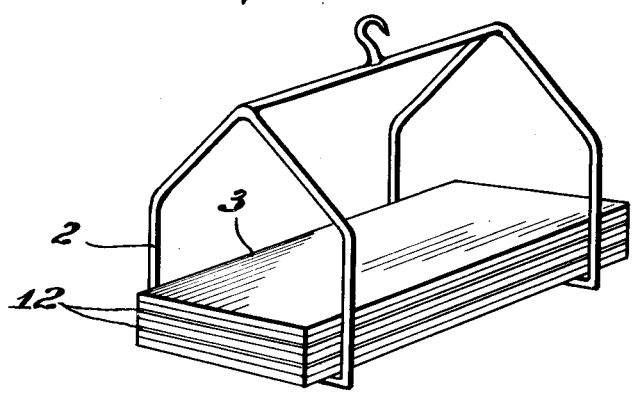

Since the carbon is gotten rid of as it is formed, faster and more uniform grooving results. A further advantage lies in the fact that the sulphuric acid concentration in the bath will always remain constant. The action of the acid on the cellulose plastic is a dehydrating one, and the water thus liberated in part, at least, furnishes the oxygen necessary for regenerating the acid. Any additional water required for this purpose is supplied by absorption from the atmosphere, or by deliberate addition. One form of apparatus which may be used in practicing the invention is shown in the accompanying drawing, wherein:

Figure 1 is a vertical section through the complete apparatus. And Fig. 2 is a perspective view on an enlarged scale of the rack employed with the laminated plates to be grooved supported therein.

Referring to the drawing, 1 is a steel tank containing sulphuric acid of about 98 per cent concentration; 2 is a rack, preferably of chrome nickel steel for supporting the plates 3; 4 is a chain or cable for raising and lowering the rack by means of a suitable hoist (not shown); 4a is a wood or composition block interposed in the chain for the purpose of insulation; 5 is a motor whose shaft 6 is provided with blades 7 for agitating the bath; 8 is a steam coil for heating the bath; 9 is a thermo couple for temperature determination; and 10 and 11 are terminals from a source of direct current supply.

The plates 3 to be grooved, each consisting of two sheets of glass cemented to the opposite sides of a sheet of organic reinforcing material are stacked in the rack as shown, with sheets 12 of light gage steel interspersed between the plates. The bath is preferably maintained at a temperature of about 200 degrees F., and during the operation, the liquid of the bath is vigorously agitated or circulated by means of the blades 7 of the agitating device. The tank is made the negative pole of the circuit by connection with the negative terminal 11, and the rack the positive pole by connection with the positive terminal 10. The current required varies, depending on the size of the tank and the character of the interlayer to be grooved out. With a tank 72 inches by 98 inches having a depth of 66 inches, good results are secured with 4 amperes of current and a voltage of 28, the grooving accomplished being substantially more rapid and uniform than is the case where the grooving is accomplished under similar conditions without the use of the electrical current. In grooving plates which have a reinforcing interlayer of cellulose acetate, the bath will in time become contaminated with acetic acid, but this may be removed by periodically boiling off when it becomes objectionable.

The use of the electric current is also of advantage in grooving with corrosive liquids other than sulphuric acid, such as mixed acid (nitric acid plus sulphuric acid), formic acid, nitric acid and the like, the grooving in all cases being accelerated by passing electric current through the bath with the plate to be grooved a part of the positive electrode. With the use of acid other than the sulphuric or mixed acids, the reaction is apparently one of concentration and solution rather than of dehydration and oxidation.

What I claim is:

1. A process of accelerating the grooving of a plate of composite glass made up of a sheet of reinforcing material lying between a pair of glass sheets, and immersed in a bath of corrosive liquid of sufficient concentration to decompose the reinforcing material, which consists in passing a current of electricity through the bath.

2. A process of accelerating the grooving of a plate of composite glass made up of a sheet of reinforcing material lying between a pair of glass sheets, and immersed in a bath of corrosive liquid of sufficient concentration to decompose the reinforcing material, which consists in passing a current of electricity through the bath, with the composite plate as a part of the positive electrode of the cell.

3. A process of accelerating the grooving of a plate of composite glass made up of a sheet of organic reinforcing material lying between a pair of glass sheets and immersed in a concentrated acid bath, which consists in passing a current of electricity through the bath with the composite plate as a part of the positive electrode of the cell.

4. A process of accelerating the grooving of a plate of composite glass made up of a sheet of organic reinforcing material lying between a pair of glass sheets and immersed in a bath of concentrated sulphuric acid, which consists in passing a current of electricity through the bath with the composite plate as a part of the positive electrode of the cell.

5. A process of accelerating the grooving of a plate of composite glass made up of a sheet of cellulose plastic reinforcing material lying between a pair of glass sheets and immersed in an acid bath, which consists in passing a current of electricity through the bath with the composite plate as a part of the positive electrode of the cell.

E. H. HAUX.